United States Patent
Cutlip (10) Patent No.: US 7,091,970 B2
(45) Date of Patent: Aug. 15, 2006

(54) MAPPING DISPLAY SPACE

(75) Inventor: Robert R. Cutlip, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 10/225,505

(22) Filed: Aug. 21, 2002

(65) Prior Publication Data

US 2004/0036688 A1    Feb. 26, 2004

(51) Int. Cl.
  *G06T 17/00*    (2006.01)
(52) U.S. Cl. ...................................... 345/420
(58) Field of Classification Search ................. 345/420
  See application file for complete search history.

(56) References Cited

U.S. PATENT DOCUMENTS

| | | | | |
|---|---|---|---|---|
| 5,812,847 | A | * | 9/1998 | Joshi et al. ................. 719/329 |
| 5,920,261 | A | * | 7/1999 | Hughes et al. ............ 340/568.8 |
| 5,983,251 | A | | 11/1999 | Martens et al. ............. 708/203 |
| 6,282,362 | B1 | | 8/2001 | Murphy et al. ............... 386/46 |

OTHER PUBLICATIONS

MySQL 4.0. http://www.mysql.com/news-and-events/news/article_81.html. Oct. 15, 2001.*
Spatial Extensions in MySQL. http://dev.mysql.com/doc/refman/4.1/en/spatial-extensions.html. 2006.*
Open GIS Simple Features Specification for SQL. http://www.opengeospatial.org/docs/99-049.pdf. Revision 1.1. May 5, 1999.*
IBM, User's Guide and Reference, "DB2 Spatial Extender", Version 7.

* cited by examiner

*Primary Examiner*—Ulka Chauhan
*Assistant Examiner*—Peter-Anthony Pappas
(74) *Attorney, Agent, or Firm*—Marcia L. Doubet (57) ABSTRACT

Techniques are disclosed for mapping display space (for example, for display devices) using extensions to spatially-enabled databases. Built-in structures and functions of a spatially-enabled object relational database system can therefore be leveraged. Use of the disclosed techniques enables, for example, quickly determining whether one object to be displayed on the display of a computing device will overlap (in space and/or in time) another object to be displayed on that device.

21 Claims, 11 Drawing Sheets

| 910 OBJECT | 920 LOCATION |
|---|---|
| xxx1 | $<P, F, T>_1$ |
| xxx2 | $<P, F, T>_2$ |
| vvv3 | $<P, F, T>_3$ |
| xxx4 | $<P, F, T>_4$ |

FIG. 9B
950

| 960 OBJECT | 970 POSITION LOCATION | 980 TIME LOCATION |
|---|---|---|
| xxx1 | $<P\_F>_1$ | $<T>_1$ |
| xxx2 | $<P\_F>_2$ | $<T>_2$ |
| vvv3 | $<P\_F>_3$ | $<T>_3$ |
| xxx4 | $<P\_F>_4$ | $<T>_4$ |

MAPPING DISPLAY SPACE

RELATED INVENTION

The present invention is related to commonly-assigned Ser. No. 09/860201, filed May 18, 2001), which is entitled "Method and System for Mapping Shelf Space" and which is hereby incorporated herein by reference. This patent is referred to hereinafter as "the related invention".

BACKGROUND OF THE INVENTION

1. Field of the Invention

The present invention relates to spatially-enabled computer databases, and deals more particularly with techniques for using extensions to a spatial reference system to map display space on devices such as an electronic display of a computing device.

2. Description of the Related Art

Geographic information systems are known in the art, and store geographic or cartographic (i.e., map-oriented) data. Systems are also known in the art for using relational databases to process (e.g., store and access) this type of geographic data. When a relational database is adapted for use with geographic information system ("GIS") data, the database is often referred to as "spatially-enabled".

Geographic data pertains to physical locations, and when using 2 dimensions, is typically expressed in terms of latitude and longitude. The latitude and longitude values for a particular location are given relative to fixed points of reference, using a coordinate system in which a latitude value represents an offset from the equator and a longitude value represents an offset from the prime meridian.

Geographic data may describe the physical location or area of a place or thing, or even the location of a person. When geographic data is stored in a spatially-enabled database, it is stored using a geometric model in which locations/ areas are expressed in terms of geometric shapes or objects. The geometric data stored according to this model may also be referred to as "spatial data". In addition to locations or areas of geographic objects, spatial data may also represent relationships among objects, as well as measurements or distances pertaining to objects. As an example of relationships among objects, spatial data may be used to determine whether a geometric shape corresponding to the location of a particular bridge intersects a geometric shape corresponding to the location of a river (thus determining whether the bridge crosses the river). As an example of using spatial data for measurements or distances, the length of a road passing through a particular county could be determined using the geometric object representing the road and a geometric object which specifies the boundaries of the county.

Spatial data values are expressed in terms of "geometry" or "geometric" data types. Thus, the location of a landmark might be expressed as a point having (x,y) coordinates, and the perimeter of a lake might be defined using a polygon. Typical spatially-enabled database systems support a set of basic geometry data types and a set of more complex geometry data types, where the basic types comprise points, line strings, and polygons, and the complex types comprise collections of points, collections of line strings, and collections of polygons.

Figure 1:
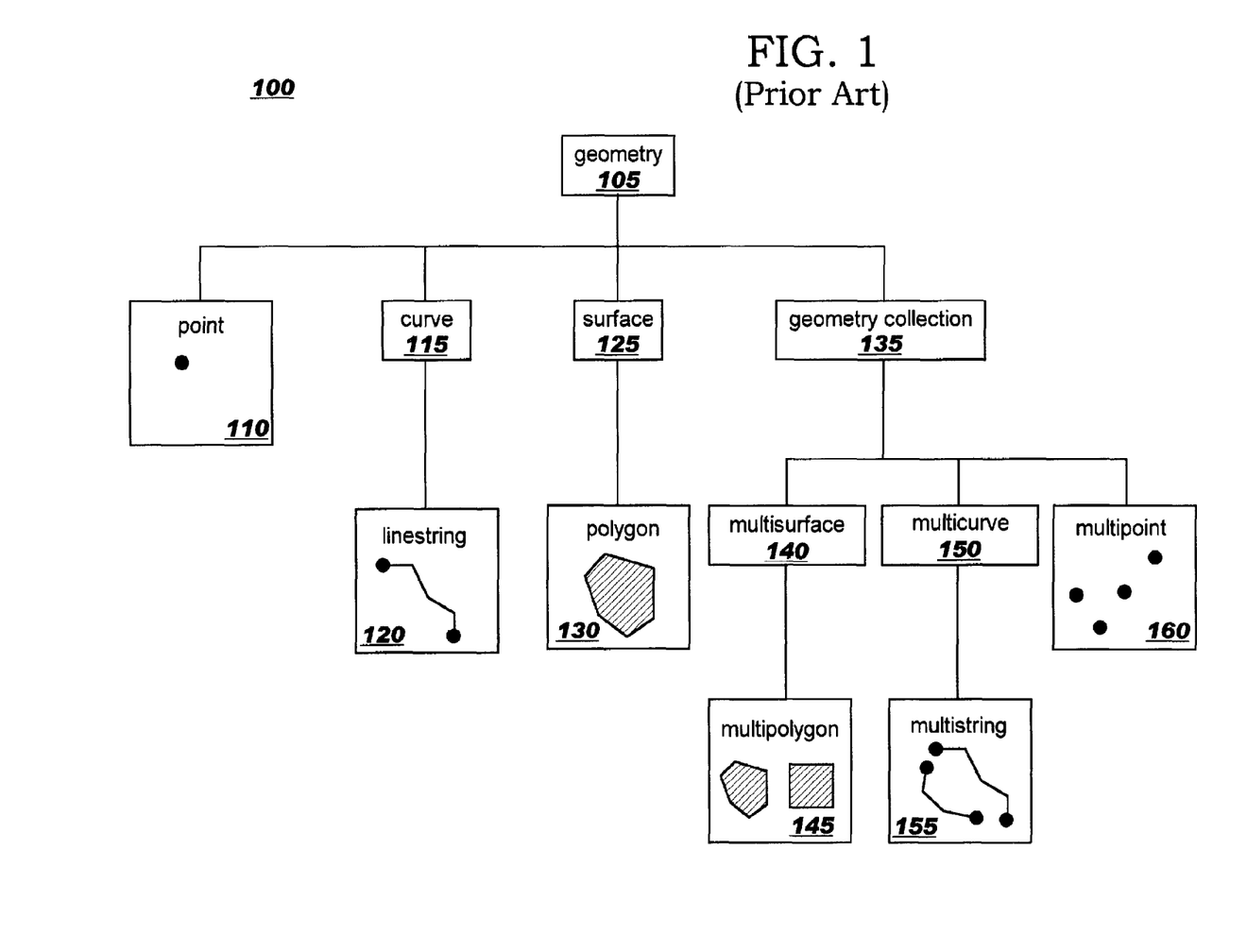
FIG. 1 illustrates a common geometric model used by spatially-enabled database systems, according to the prior art.

A common geometric model used by spatially-enabled database systems is shown in FIG. 1. As depicted therein, the model is structured as a hierarchy or tree 100 having geometry 105 as its root, and having a number of subclasses. Point 110, linestring 120, and polygon 130 represent the basic geometry data types. In this model 100, linestring 120 is a subclass of curve 115, and polygon 130 is a subclass of surface 125. Geometry collection class 135 is the root of a subtree representing the more complex geometric data types, and each subclass thereof is a homogeneous collection. Multipolygon 145, multistring 155, and multipoint 160 represent the collections of polygons, line strings, and points, respectively. Multipolygon 145 is a subclass of multisurface 140 in this model, and multistring 155 is a subclass of multicurve 150. Only the classes which are leaves of this tree 100 are instantiable in typical spatially-enabled database systems; the other nodes correspond to abstract classes. (Each of these entities is an actual data type.)

Referring now to the basic data types in particular, geometric data according to the model 100 of FIG. 1 may be expressed in terms of a single point having (x,y) coordinates, or may be described as a line string or a polygon. A line string may be considered as one or more line segments which are joined together, and is defined using an ordered collection of (x,y) coordinates (i.e., points) that correspond to the endpoints of the connected segments. A polygon is defined using an ordered collection of points at which a plurality of line segments end, where those line segments join to form a boundary of an area.

Many different examples may be imagined where points, line strings, and polygons can be used for describing geographic locations or areas. A point might represent the location of a landmark such as a house or a building, or the intersection of two streets. A line string might be used to describe a street, or the path of a river or power line, or perhaps a set of driving directions from one location to another. A polygon might be used to describe the shape of a state or city, a voting district, a lake, or any parcel of land or body of water.

Once spatial information has been stored in a database, the database can be queried to obtain many different types of information, such as the distance between two cities, whether a national park is wholly within a particular state, and so forth.

As one example of a spatilly-enabled database, a feature known as "Spatial Extender" can be added to IBM's DB2® relational database product to provide GIS support. Spatial Extender provides support for the geometric data types shown in FIG. 1, and provides a number of built-in functions for operating on those data types. When using Spatial Extender, spatial data can be stored in columns of spatially-enabled database tables by importing the data or deriving it. The import process uses one of several input formats (such as text or binary data, the details of which are not pertinent to the present invention), and processes that data using built-in functions to convert it to geometric data. Spatial data may be derived either by operating on existing geometric data (for example, by defining a new polygon as a function of an existing polygon) or by using a process known as "geocoding". A geocoder provided with Spatial Extender that takes as input an address in the United States and derives a geometric point representation. Other geocoders can be substituted to provide other types of conversions.

Refer to "IBM® DB2® Spatial Extender User's Guide and Reference", Version 7.2, published by IBM as IBM publication SC27-0701-01, for more information on Spatial Extender. This User's Guide is hereby incorporated herein as if set forth fully, and is hereinafter referred to as the "Spatial Extender User's Guide". ("IBM" and "DB2" are registered trademarks of International Business Machines Corporation.)

The related invention discloses techniques for mapping shelf space using a spatial reference system. The location of a product on a particular shelf can be stored in a spatially-enabled database, and the location of the shelf within a particular aisle of an interior of a structure can be similarly represented. A time duration for which a product remains on a shelf can also be specified.

SUMMARY OF THE INVENTION

An object of the present invention is to provide techniques for mapping display space.

Another object of the present invention is to provide techniques for using a spatially-enabled database to map display space of a device (such as an electronic display which may be provided by various computing devices).

A further object of the present invention is to define techniques for mapping display space using a spatial reference system.

Still, another object of the present invention is to define extensions to a spatial reference system for mapping display space.

Yet another object of the present invention is to define techniques for using a spatially-enabled database to relate display objects within pages and/or frames to each other.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for mapping display space using spatial extensions. In a preferred embodiment, this technique comprises: establishing a spatial reference system representing the display space, based upon a coordinate reference system representing the display space; establishing the display space as a geometric entity within the spatial reference system; and describing, as geometric entities, objects to be displayed on the display space using the spatial extensions.

The spatial extensions may further comprise descriptions of a position of the objects in a page or frame and a position of the page or frame within the display space. Alternatively, the spatial extensions may further comprise descriptions of a position of the objects in a page or frame, a position of the page or frame within the display space, and a point in time or a duration of time that the objects occupy the position in the page or frame within the display space.

The technique may further comprise establishing a spatial column for storing a set of spatial data corresponding to the geometric entities describing the objects to be displayed. The technique may also further comprise establishing an attribute column in a spatially-enabled database storing the geometric entities describing the objects to be displayed, wherein the attribute column stores attribute data corresponding to each of the objects to be displayed.

The technique may further comprise establishing a spatial column in a spatially-enabled database storing the geometric entities describing the objects to be displayed, wherein the spatial column is adapted for storing a set of spatial data corresponding to a position of the objects in a page or frame and the position of a page or frame within the display space. Optionally, an additional column may be established in the spatially-enabled database, where this additional column is adapted for storing a set of spatial data corresponding to a point in time or a duration of time that the objects occupy the position in the page or frame within the display space.

Operations may be performed using the spatial data. For example, the described geometric entities may be used to determine the layout of the objects on the display space. As another example, the described geometric entities may be used to determine a spatial relationship between a first object and a second object on the display space.

The present invention will now be described with reference to the following drawings, in which like reference numbers denote the same element throughout.

DESCRIPTION OF PREFERRED EMBODIMENTS

The present invention discloses techniques whereby data stored in spatially-enabled databases can be used to map display space for devices (such as the display screen of a computing device). Extensions to a data model used in known commercially-available systems are disclosed herein to enable this mapping. This provides a novel integration focus, whereby object-relational database systems and their inherent integration and data control are leveraged. Furthermore, commercially-available software systems are available for tracking and analyzing spatially-enabled database columns, and these systems may be used with the extensions disclosed herein to track and analyze display space information.

Typically, spatially-enabled databases store information referring to geographic locations. The present invention uses relative positions in 2-dimensional space, along with a time dimension, to represent objects to be rendered in a display space.

While discussions herein refer to use of 2-dimensional space, this is for purposes of illustration and not of limitations. The inventive techniques disclosed herein may be used in a 3-dimensional display mapping for a proper display space, such as a holographic or other display which provides (or simulates) 3 dimensions. Refer to the related invention for more information on how 3-dimensional space is used for mapping shelf space. The teachings of the present invention may be applied to 3-dimensional space in a similar manner.

As an example of using the techniques disclosed herein for 3-dimensional mappings, the human body might be represented in stored data using 3 dimensions, for example for purposes of anatomical studies, with the spatial reference system being adapted to modify the coordinate reference data prior to storage. The coordinate reference system in turn might be devised to maintain approximate distances between body parts, or to preserve the approximate shape of an organ. This information may be used when displaying a view in 2 dimensions or in a 3-dimensional rendering.

Using a spatially-enabled relational database with data type extensions as disclosed herein, operations on that data can leverage the native data normalization and data management facilities provided by the database system. The spatial extensions, geometric data types, grid indexing functions, user-defined functions, and built-in procedures of the database system can also be leveraged to optimize operations on the tables containing display space information. The built-in relational database functions for querying tables and retrieving data therefrom and built-in spatial data functions may be leveraged by software that displays objects on a display device (and/or manages display objects). In this manner, operations on the stored data can use optimized built-in functions of the database system, rather than requiring programmers to develop complex code for interacting with this data. As a result, programmer efficiency is increased and code complexity is reduced, thereby leading to decreased program development and support costs. Furthermore, use of the optimized built-in database functions for interacting with the stored data may increase the efficiency of programs which display and/or manage data.

Preferred embodiments of the present invention are implemented in a DB2® object relational database system in which the Spatial Extender feature has been installed to provide spatial data support. Alternate embodiments may use similar systems.

The manner in which preferred embodiments of the present invention operate to map display space will now be described with reference to FIGS. 2–9B.

Figure 2:
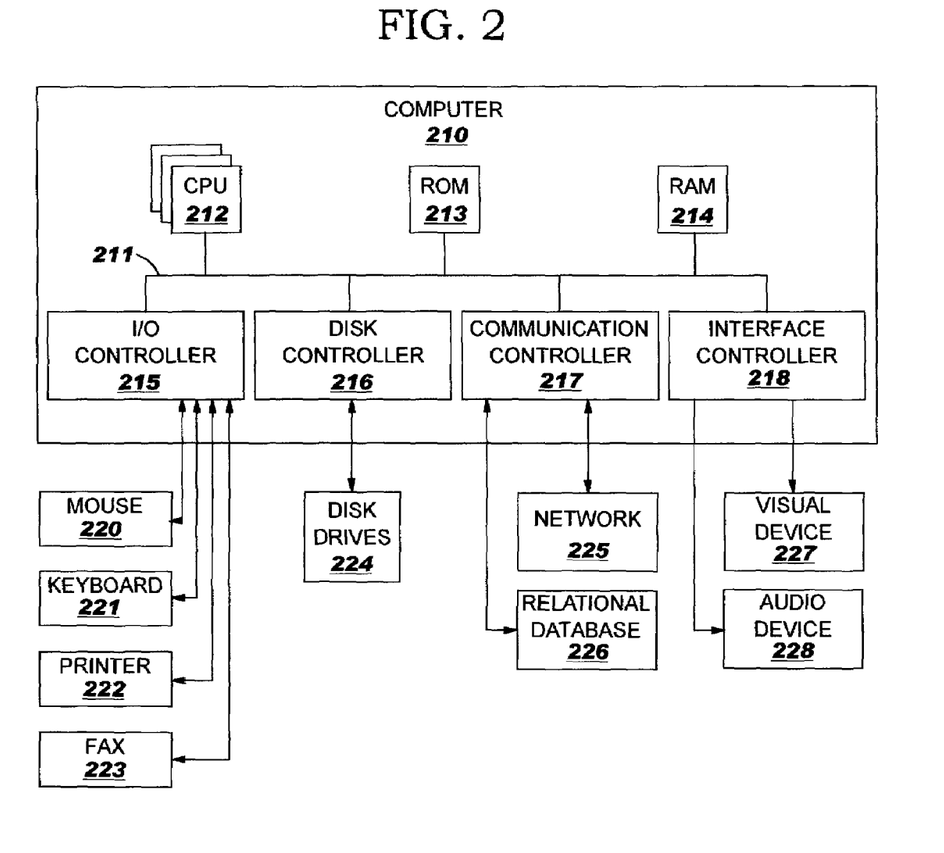
FIG. 2 is a block diagram of a computer system that may be employed in the present invention.

A computer 210 that may be used in the present invention is shown in FIG. 2. Computer 210 may be configured in a number of different forms for accepting input, processing the input according to specified instructions, and outputting the processing results, as is well known in the art. Computer 210 may be, for example, a personal computer, a workstation, a supercomputer, a mainframe computer, a minicomputer, a handheld computer, a wearable computing device, a personal digital assistant ("PDA"), a smart appliance in the home, and so forth. By way of example, computer 210 may function as a server in a client/server architecture in a networking environment; alternatively, computer 210 may be a client device in a client/server architecture, a device operating within another networking environment, or a stand-alone device not operating within a networking environment.

As shown in FIG. 2, computer 210 preferably includes a bus 211 for facilitating electrical communication among one or more central processing units ("CPUs") 212, a read-only memory ("ROM") 213, a random access memory ("RAM") 214, an input/output ("I/O") controller 215, a disk controller 216, a communication controller 217, and a user interface controller 218.

CPU 212 is preferably one of the Intel families of microprocessors, one of the Advanced Micro Devices, Inc. families of microprocessors, one of the Motorola families of microprocessors, or one of the various versions of a Reduced Instruction Set ("RISC") microprocessor such as the PowerPC® chip manufactured by IBM. In preferred embodiments, ROM 213 stores various controlling programs such as the Basic Input-Output System ("BIOS") developed by IBM. RAM 214 is preferably used for loading an operating system and selectively loading controlling programs and/or application programs. ("PowerPC" is a registered trademark of IBM.)

I/O controller 215 may be an aggregate of controllers for facilitating interaction between CPU 212 and one or more input devices, such as a keyboard 221 and a pointing device such as a mouse 220. I/O controller 215 may also facilitate interaction between CPU 212 and one or more output devices, such as a printer 222 or fax 223.

Disk controller 216 may be an aggregate of controllers for facilitating interaction between CPU 212 and disk drives 224 and/or other types of data storage devices. Disk drive 224 is generally representative of a hard drive, floppy disk drive, compact-disk ("CD") drive, etc. Preferably, an operating system (which in preferred embodiments is a conventional operating system such as AIX® from IBM or Windows® from Microsoft Corporation) is stored on a disk drive 224, for loading into memory 214. ("AIX" is a registered trademark of IBM, and "Windows" is a registered trademark of Microsoft Corporation.) Communication controller 217 may be an aggregate of controllers for facilitating interaction between CPU 212 and a network 225. According to preferred embodiments, communication controller 217 also facilitates interaction between CPU 212 and an object-relational database ("ORDB") 226 stored on one or more local or remote data storage devices.

User interface controller 218 may be an aggregate of controllers for facilitating interaction between CPU 212 and one or more user interface devices, such as visual device 227 and/or audio device 228. For example, visual device 227 may represent any of a number of graphic display devices, such as a monitor or other display, and audio device 228 may represent a speaker or other audio device.

Those of skill in the art will recognize that the components depicted in FIG. 2 are provided by way of example and are not intended to limit the present invention.

Figure 3:
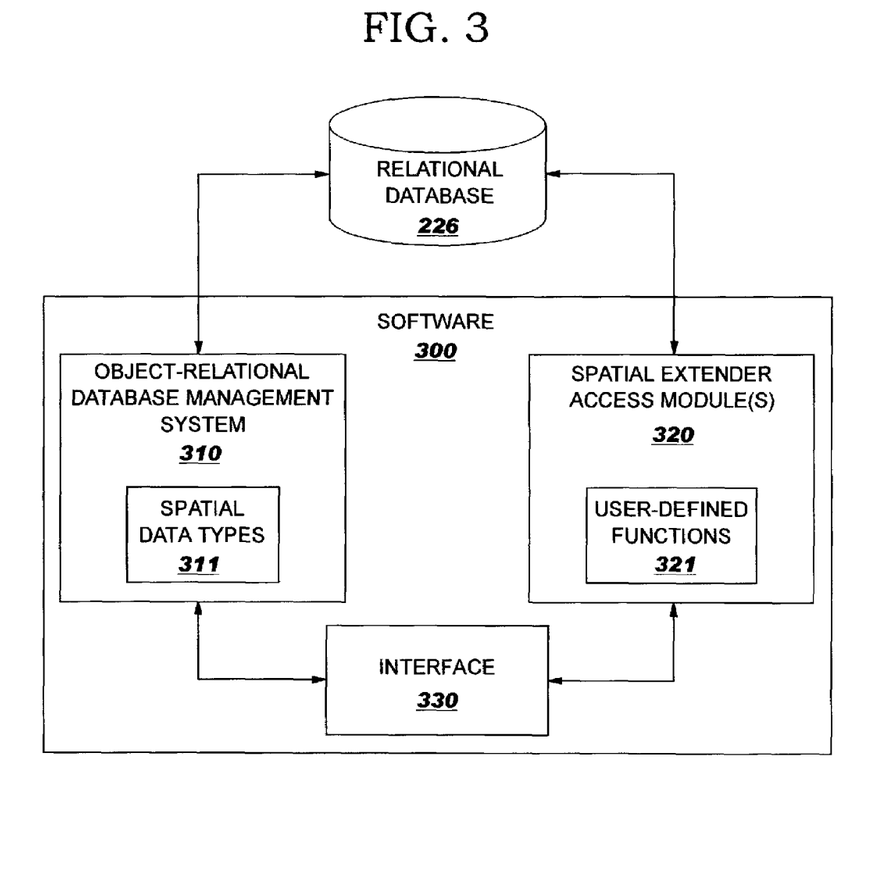
FIG. 3 is a block diagram of computer software which may be employed in the computer system of FIG. 2, according to preferred embodiments of the present invention.

Referring now to FIG. 3, software 300 is illustrated. Software 300 preferably comprises one or more modules written in an object-oriented language, and executes on computer 210 of FIG. 2 to provide a display space mapping routine (shown in FIG. 4) under control of an operating system. The modules comprising software 300 may be physically stored within one or more fixed or removable computer-readable media that is electrically, magnetically, optically, chemically, or otherwise altered to store computer-readable program code, where this media is readable by a device such as disk drive 224.

In other embodiments of computer 210, software 300 may be stored in one or more other computer-readable media, such as a CD-ROM disk. Alternatively, software 300 or portions thereof may be downloaded to RAM 214 via network 225. In other embodiments of computer 210, software 300 can be partially or fully implemented with digital circuitry, analog circuitry, or a combination thereof.

The ORDB 226 is preferably stored on one or more local or remote storage devices 224, and interacts with software 300 during operation of the display space mapping techniques disclosed herein.

In preferred embodiments, software 300 includes an object-relational database management system ("ORDBMS") 310, including spatial data types 311, one or more spatial extender access modules 320, and a conventional interface 330 (e.g., a graphical user interface and/or a network interface) for establishing communication with visual device 227 and/or network 225. In one embodiment of software 300, ORDBMS 310 and module(s) 320 incorporate a Structured Query Language ("SQL") interface. An execution of ORDBMS 310 under control of the operating system facilitates storage of data within ORDB 226 and other operations on this data (such as retrieving, querying, etc.), as will be obvious to one of skill in the art. An execution of spatial extender access module(s) 320 (referred to equivalently herein as a GIS under control of the operating system facilitates storage of spatial data and objects within ORDB 226, as well as querying of the spatial data and objects and other operations, as will also be obvious to one of skill in the art.

Optional user-defined functions 321 allow accessing (e.g., storing, retrieving, comparing, modifying, etc.) mapping data in application-specific ways.

Figure 4:
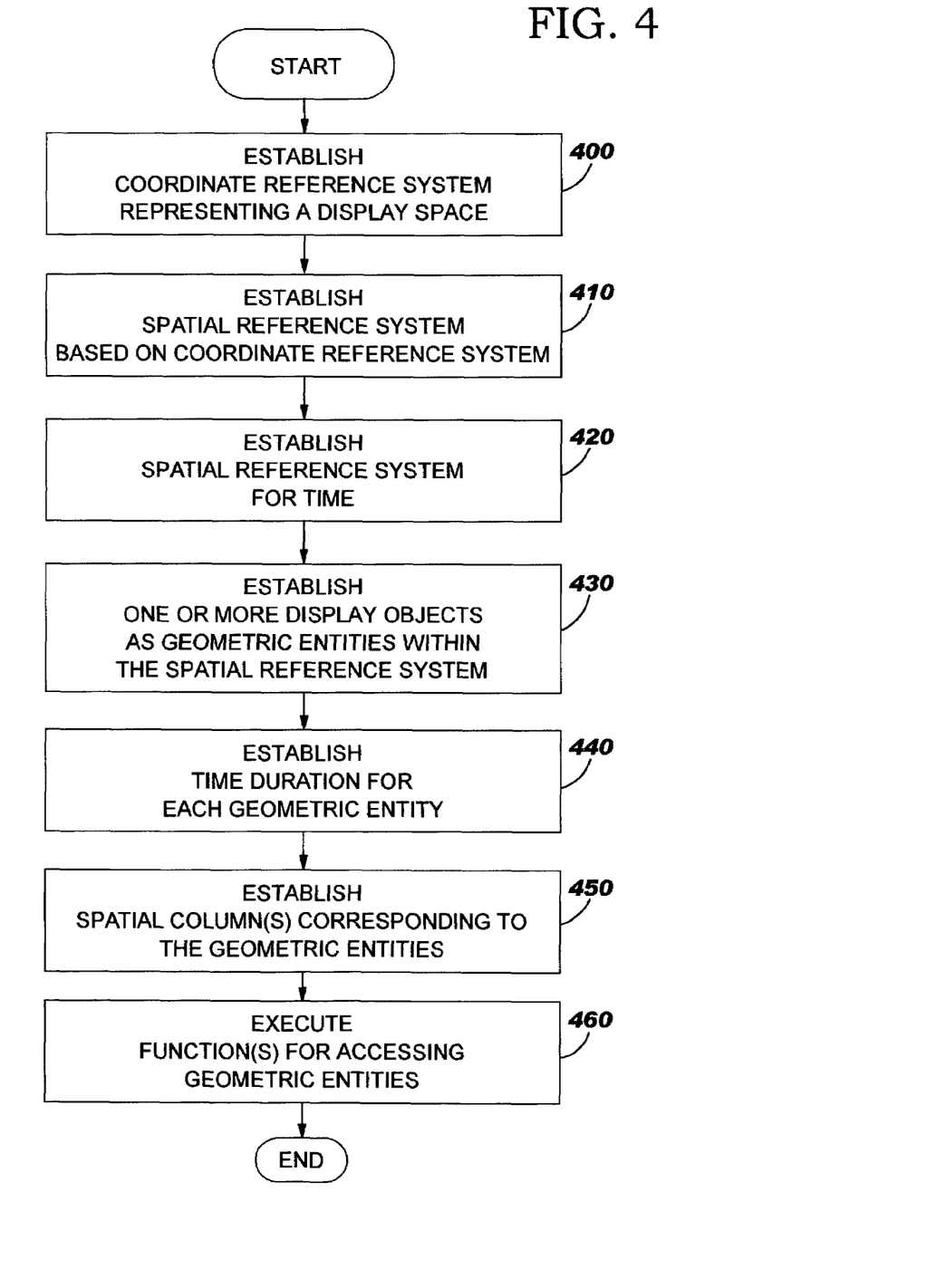
FIG. 4 provides a flowchart illustrating logic that may be used to implement a display space mapping routine, according to preferred embodiments of the present invention.

FIG. 4 provides a flow chart illustrating logic that may be used to implement preferred embodiments of display space mapping, for example by a GIS such as module(s) 320, as disclosed herein. As shown in FIG. 4, a coordinate reference system ("CRS") representing the display space is established (Block 400). This establishment process may comprise generating, retrieving, and/or importing a description of the display space, using techniques which are known in the art. In preferred embodiments, the CRS corresponding to the display space is a 2-dimensional CRS, as illustrated by element 500 in FIG. 5.

Figure 5:
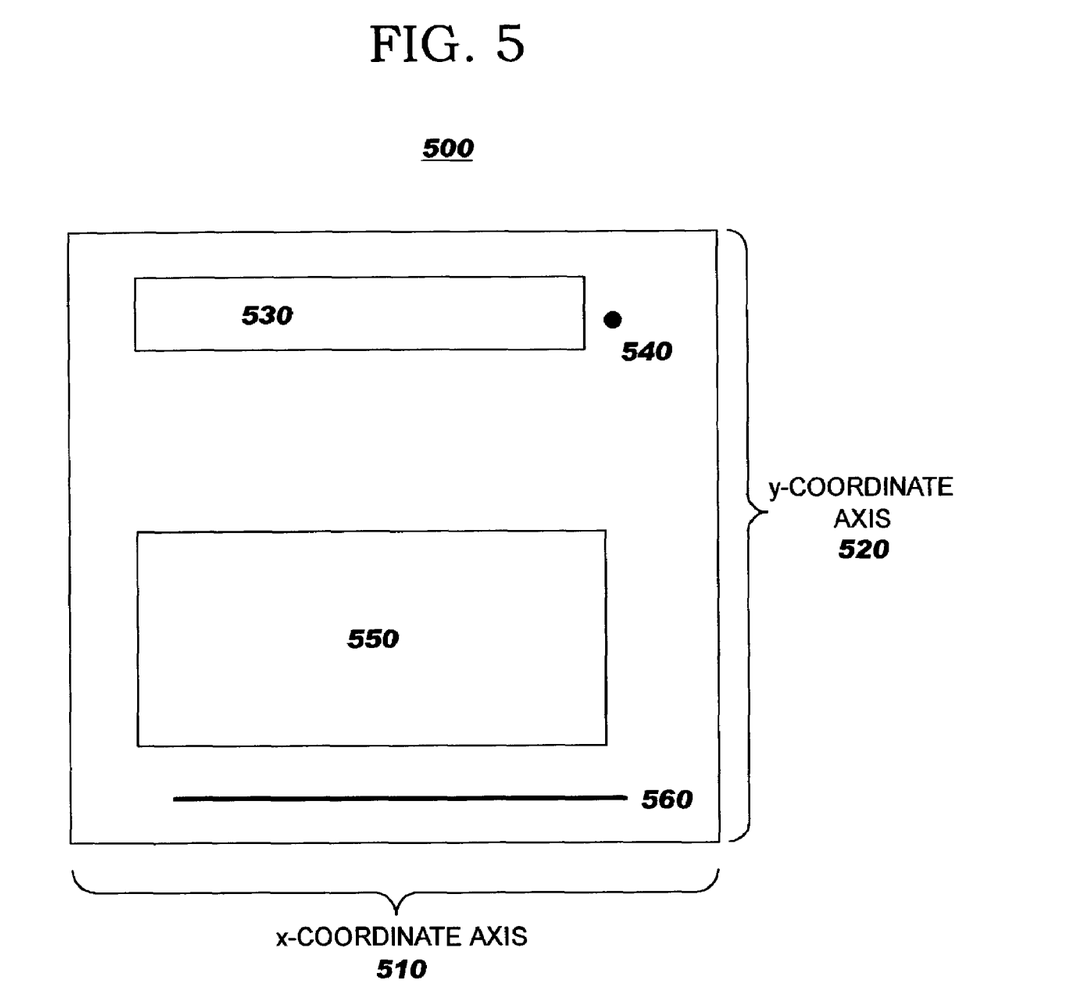
FIG. 5 illustrates an exemplary two-dimensional coordinate reference system of a display space, according to preferred embodiments of the present invention.

FIG. 5 is representative of a typical display space, which is arranged as a rectangular 2-dimensional surface on which one or more pages and/or one or more frames may be displayed during operation of an application program. Alternatively or in addition, the display may be comprised of one or more graphical objects of various shapes, each of which may overlay other objects (including another page/frame that serves as a background). In this example, a rectangular object 530 is displayed, and may serve to display a title bar for a visual display. A single (x,y) point on the display layout might also be identified, as shown in the example at 540, and might serve as a point of reference, such as a screen location for an action. (On a display space defined by large-block pixels, a point may occupy a considerable amount of space; on other displays, a point may be relatively small.) Another rectangular object 550 is shown in the example, and might represent the display space to be occupied by a tabular representation of data or perhaps by the body of a displayed page. Finally, the example shows a line segment 560, which might represent a delineation of the display layout (for example, to separate the page body from the page footer area).

Those of skill in the art will recognize that, in some cases, the x-coordinate axis 510 and y-coordinate axis 520 may contain non-integer coordinates and may contain negative coordinates. For example, depending on the rendering software in use for rendering a defined layout on the display device, the placement of the graphical objects might be described with reference to a coordinate system that places coordinates (0,0) at the lower left of the display space layout, or in the middle of the layout, and so forth.

Figure 6:
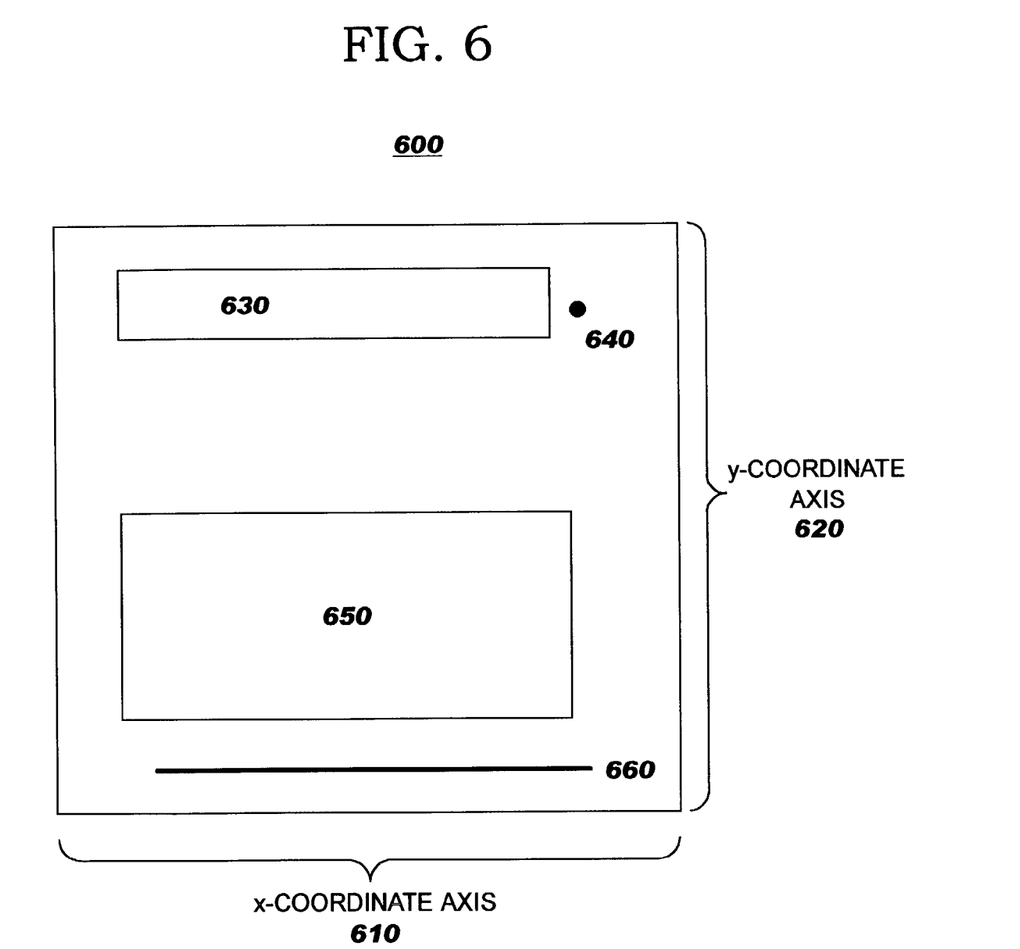
FIG. 6 illustrates an exemplary two-dimensional spatial reference system of a display space, according to preferred embodiments of the present invention.
Figure 7:
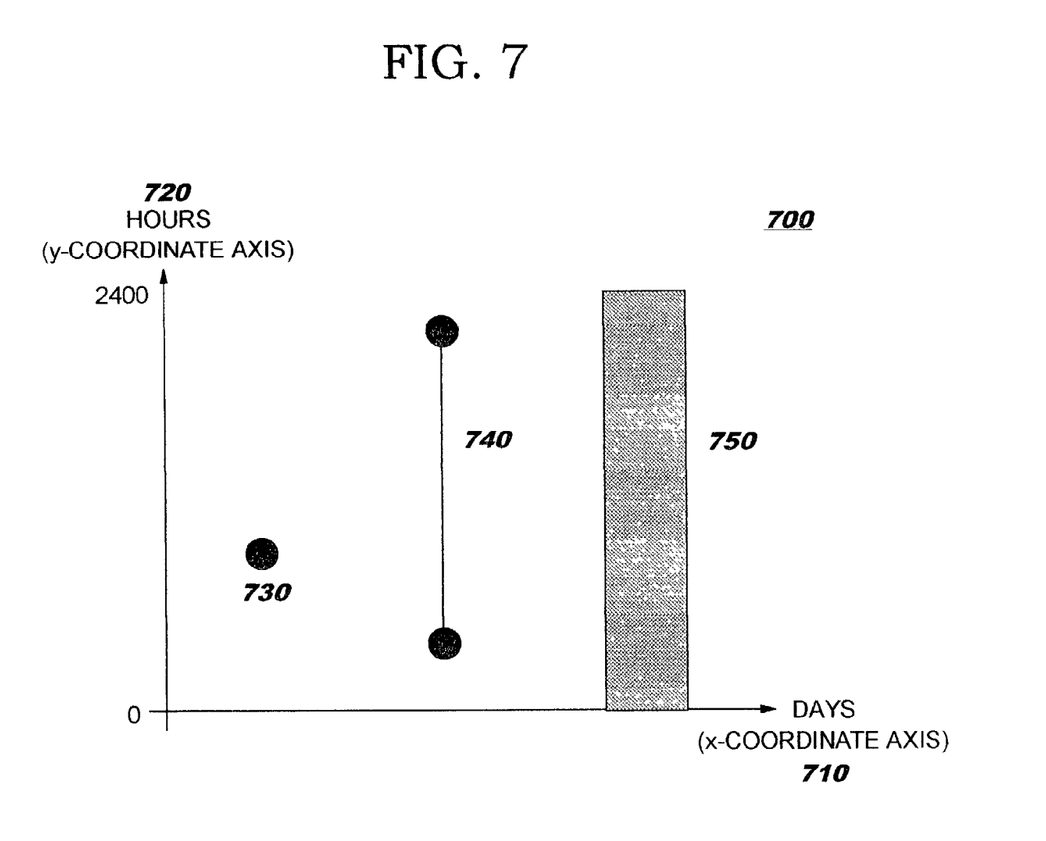
FIG. 7 illustrates an exemplary two-dimensional spatial reference system of a time component, according to preferred embodiments of the present invention.

Returning to FIG. 4, in Block 410, CRS 500 serves as basis for establishing a spatial reference system ("SREF") representing the layout of the display space. Preferably, the SREF is a 2-dimensional SREF based on CRS 500. This 2-dimensional SREF is illustrated at element 600 in FIG. 6. Use of the SREF ensures that values for the x-coordinate axis 610 and y-coordinate axis 620 of SREF 600 will be stored in the relational database as positive integer values. Additionally, in Block 420, a 2-dimensional SREF 700 is preferably established for time as shown in FIG. 7, where this SREF 700 includes an x-coordinate axis 710 and a y-coordinate axis 720. The x-coordinate axis and y-coordinate axis may represent any standard measure of time that is deemed useful by a particular implementation. In preferred embodiments, the x-coordinate axis represents days and the y-coordinate axis represents hours, where values of the days and hours will be positive integer values that represent the duration fin a geometric object to be displayed on a display space. For example, a background might occupy a display space on a long-term basis, while a title bar might be displayed on the space (or overlaid on the background) for some short period of time. Instead of days and hours, shorter or longer time frames might be used alternatively. As an example of shorter time frames, a web portal display might be defined as including portlet output, such as a stock ticker display between the hours of 9:30 and 4:00, or the current weather conditions during the time period in which employees normally leave the office for lunch, and so forth.

Use of a time dimension is an optional aspect of the present invention. While preferred embodiments are described herein as using fixed time coordinates, alternative embodiments may interpret the time axes as relative time. For example, time value (0,0) may be used to represent the initially-rendered display on the display space, while time value (1,5) might represent 5 minutes into the first hour after the initial display.

Block 430 establishes, as geometric entities within SREF 600, one or more display objects that are to be rendered in a display space. Preferably, these geometric entities comprise one or more points, line strings, and/or polygons, as discussed earlier. For example, a polygon 630 as shown in FIG. 6 may be established in SREF 600 as a geometric representation of the display area for a title bar 530 in FIG. 5, and a polygon 650 may be established to represent the display area for tabular data 550. A point 640 may be established in SREF 600 as a geometric representation of the (x,y) coordinates at 540 of FIG. 5, and a line string 660 may be established as a geometric representation of line segment 560.

Furthermore, a time component indicating a duration of displaying each geometric entity may be established (Block 440). The time component may be represented as a point, a line string, or a polygon, depending on how long a particular object is to be displayed. When represented as a point (see element 730 of FIG. 7), an object will be displayed briefly, for example during a transient frame display. When represented as a line string (see element 740 of FIG. 7), the object (in the case of a vertical line) is to be displayed from time y1 until time y2, where y1 is the time corresponding to the bottom of the line string and time y2 is the time corresponding to the top of the line string. (Note that, by their definition, line string entities are not limited to linear geometric shapes.) When represented as a polygon (see element 750 of FIG. 7), the object is to be displayed starting at time (x1, y1) and continuing until time (x2, y2), where (x1, y1) are the coordinates of the lower left corner of the polygon and (x2, y2) are the coordinates of the upper right corner.

Figure 8A:
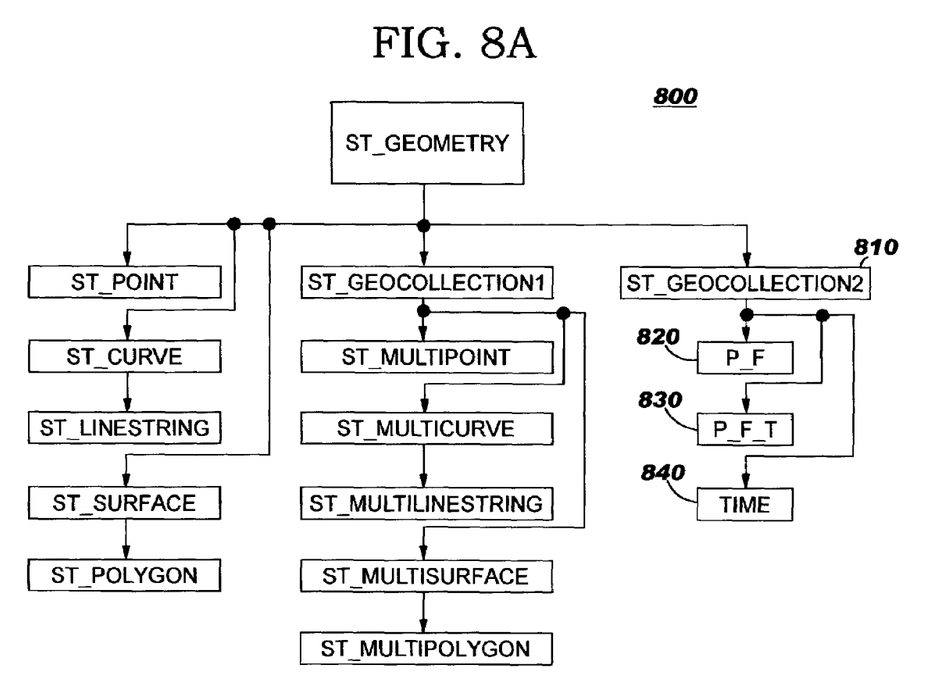
FIG. 8A illustrates a hierarchy of spatial data types, according to preferred embodiments of the present invention.

Referring now to FIG. 8A, in preferred embodiments, the basis for establishing the geometric entities within SREF 600 and SREF 700 are spatial data types 311 (see FIG. 3), which are extensions 810, 820, 830, 840 of a well-established hierarchy 800 of spatial data types.

Spatial data types 311 are extended, according to the present invention, to include a noninstantiable form of a data type 810 which in the example is named "ST_GEOCOLLECTION2". In preferred embodiments, this data type 810 comprises data types referred to as a "P_F" data type 820, a "P_F_T" data type 830, and a "Time" data type 840 (each of which is also non-instantiable).

Figure 8B:
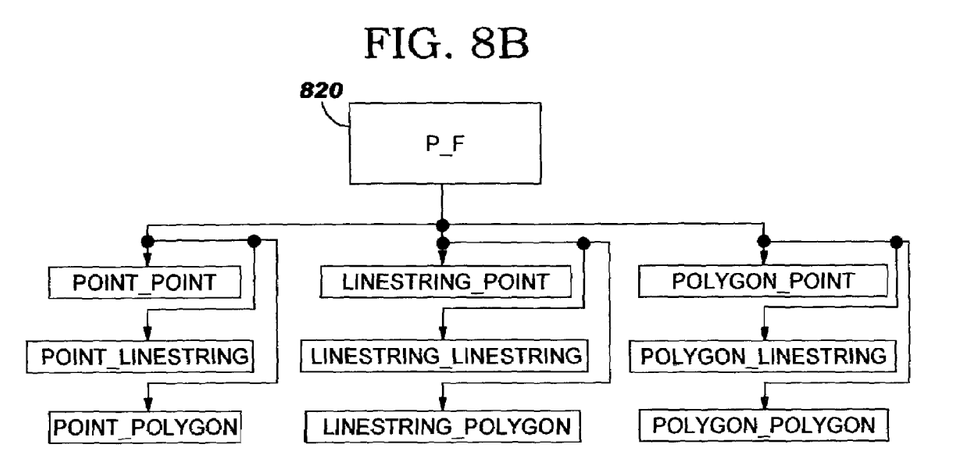
FIGS. 8B–8D illustrate branches of the hierarchy shown in FIG. 8A, according to preferred embodiments of the present invention.

P_F data type 820 includes, in preferred embodiments, a number of instantiable data types, as shown in FIG. 8B. These instantiable data types within abstract data type P_F define a position "P" or location of an object in a page or frame, and a position or location "F" of this page or frame within a display space. For example, a button or icon might be defined as occupying a position within a frame that will be displayed at the bottom of a particular page. The P_F data type can be used to relate this button or icon to the frame. When using a point value for "P", the location might identify an anchor or starting location for an object.

Figure 8C:
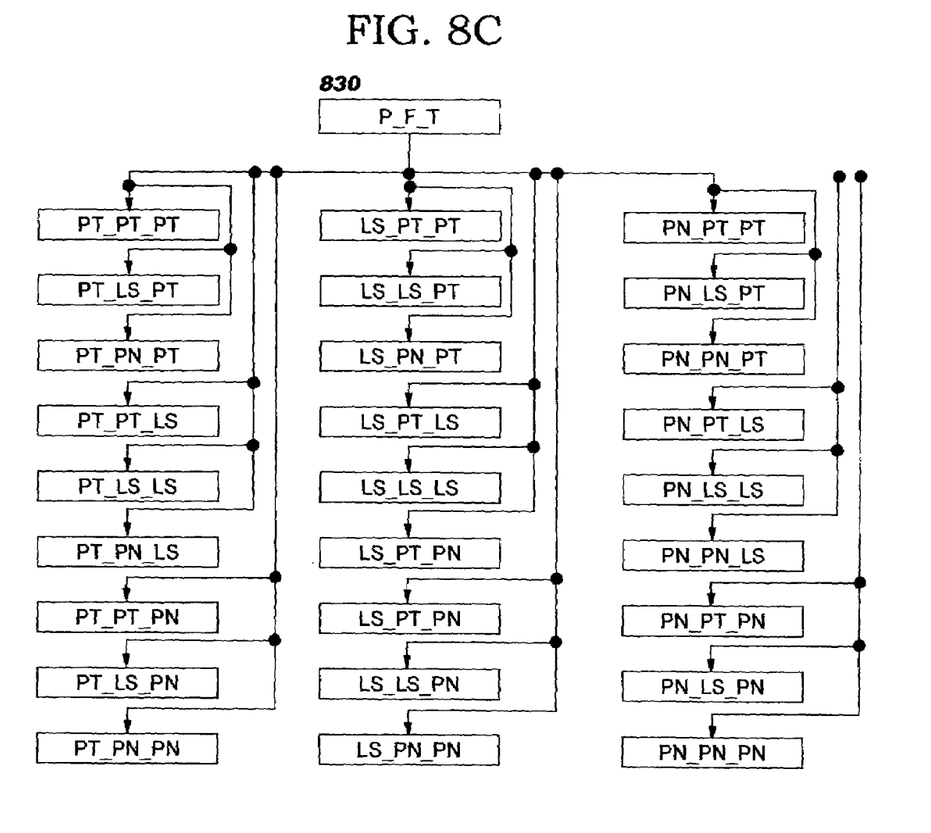

P_F_T data type 830 includes, in preferred embodiments, data types in instantiable form as shown in FIG. 8C. These instantiable data types within abstract data type P_F_T may be used to define a position "P" of an object within a page/frame "F" at a point in time "T" (or duration of time). For example, a "welcome" banner object might be displayed temporarily on a page or frame, and an instance of P_F_T data type could be used for this purpose. In FIG. 8C, "PT" is an abbreviation for point, "LS" is an abbreviation for line string, and "PN" is an abbreviation for polygon.

Figure 8D:
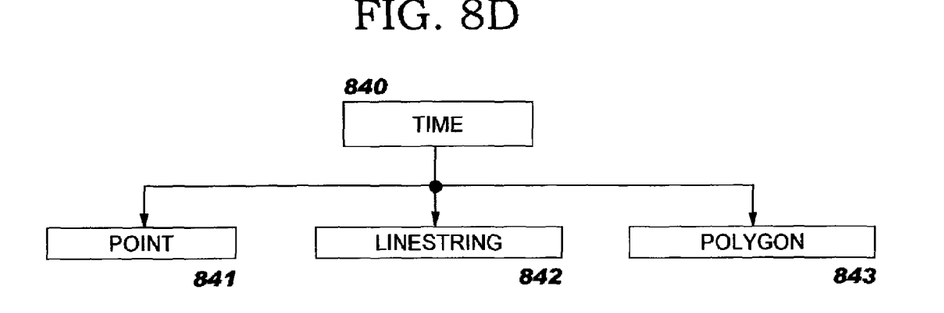

Time data type 840 includes, in preferred embodiments, several instantiable data types, as shown in FIG. 8D. These instantiable data types within abstract data type Time 840 describe a point in time or a duration of time that an object occupies a particular location in the display space. For example, an instantiation of Point 841 may represent point 730 of FIG. 7, an instantiation of Linestring 842 may represent line string 740 of FIG. 7, and an instantiation of Polygon 843 may represent polygon 750 of FIG. 7.

Figure 9A:
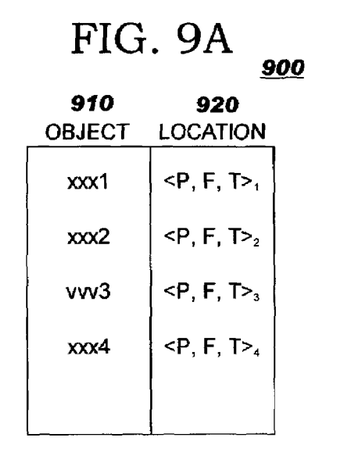
FIGS. 9A and 9B illustrate tables which may be used to store spatial data for use with preferred embodiments of the present invention.

Returning to FIG. 4, one or more spatial columns corresponding to the spatial reference systems are established, in Block 450, within ORDB 226. By way of example, table 900 in FIG. 9A illustrates an exemplary attribute column 910 labeled "object", which preferably contains some type of unique object identifier, and an exemplary location column 920 which contains a geocoded spatial data extension value that describes the object's position in space and time. In column 920, "P" is a point, line string, or polygon representing the coordinates of SREF 600, indicating a location of the object on a page or frame; "F" is a point, line string, or polygon representing the coordinates of SREF 600, indicating a location of a page or frame within the display space; and "T" is a point, line string, or polygon representing the coordinates of SREF 700, indicating a point in time or duration of time that the object occupies a particular location in the display space. Optionally, a key or index may be provided for the entries in table 900 to facilitate more efficient access to the location column or its sub-elements.

Figure 9B:
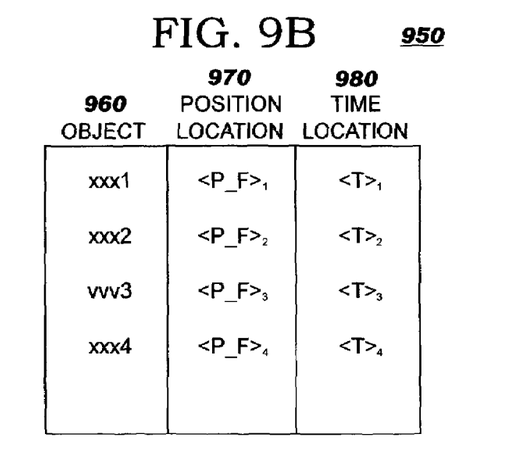

Also by way of example, table 950 in FIG. 9B illustrates an exemplary attribute column 960 labeled "object", which (as in FIG. 9A) preferably contains some type of unique object identifier, and a pair of exemplary columns labeled "position location" 970 and "time location" 980. Columns 970 and 980 have spatial data extension values geocoded and stored therein that describe object's position in space (column 970) and time (column 980). Values in columns 970 correspond to the "P" and "F" values described with reference to FIG. 9A, and values in columns 980 correspond to the "T" values which have been described. Optionally, a key or index may be provided for the entries in table 950 to facilitate more efficient access to the location columns.

When time values are not used by an implementation of the present invention, the time column 980 is omitted from table 950 (and the location values in column 920 of table 900 are replaced by values of the P_F data type).

Returning again to FIG. 4, at Block 460, conventional user-defined functions 321 and/or built-in functions of GIS 320 may be invoked to access one or more geometric data values stored in the spatially-enabled database columns. The logic in FIG. 4 then ends. (As will be obvious, blocks of this flow chart may be repeated for a particular iteration; for example, multiple functions may be invoked at Block 460.)

Examples of the functions invoked in Block 460 include determining whether one object to be displayed will overlap another object to be displayed (either in space and/or in time) or building a display screen layout. Many other scenarios may be envisaged once the teachings disclosed herein are known.

As has been described, the present invention defines techniques for using spatially-enabled databases to map display space. Advantages thus provided include leveraging spatial functions which are built into a GIS (such as GIS 320 of FIG. 3). The extensions disclosed herein enable exploiting known commercial technology to provide a novel integration focus, and leverage object-relational database systems and their inherent integration and data control. Location data at varying levels of granularity may be defined within the geospatial definition of the display space objects, and abstract data types may be extended as disclosed herein to include a time dimension within the geospatial object definitions. Built-in grid accessing functions may be used for efficient access. Geospatial (i.e., spatially-enabled) columns using the disclosed data types may be added directly to existing relational tables (including tables in star-schema data warehouses).

As will be appreciated by one of skill in the art, embodiments of the present invention may be provided in various forms, including methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code embodied therein.

The present invention has been described with reference to flow diagrams and/or block diagrams of methods, apparatus (systems), and computer program products according to preferred embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications may occur to those skilled in the art once they learn of the basic inventive concepts. Therefore, it is intended that the appended claims shall be construed to include the preferred embodiments and all such variations and modifications as fall within the spirit and scope of the invention.

What is claimed:

1. A computer-implemented method of mapping display space using spatial extensions, comprising steps of:
    establishing a spatial reference system representing a display space of a device, based upon a coordinate reference system representing the display space;
    establishing the display space as a geometric entity within the spatial reference system; and
    storing, as geometric entities using the spatial extensions in a spatially-enabled database, descriptions of how objects are to be displayed on the display space, wherein the spatial extensions further comprise one or more data types for representing, for each of the objects, a geocoded description of a position of the object in a page or frame, a position of the page or frame within the display space, and a point in time or a duration of time that the object occupies the position in the page or frame within the display space.

2. The computer-implemented method according to claim 1, wherein the storing step further comprises the step of establishing, in the spatially-enabled database, a spatial column for storing a set of spatial data corresponding to the geometric entities describing how the objects are to be displayed.

3. The computer-implemented method according to claim 2, further comprising the step of establishing, in the spatially-enabled database, an attribute column for use by the storing step, wherein the attribute column stores attribute data corresponding to how each of the objects is to be displayed.

4. The computer-implemented method according to claim 1, further comprising the step of:
    establishing in the spatially-enabled database, a spatial column for use by the storing step, wherein the spatial column is adapted for storing for each of the objects, a set of spatial data corresponding to the position of the object in the page or frame, the position of the page or frame within the display space, and the point in time or the duration of time.

5. The computer-implemented method according to claim 1, further comprising the steps of:
    establishing a first spatial column in the spatially-enabled database for storing, for each of the objects, a first set of spatial data corresponding to the position of the object in the page or frame and the position of the page or frame within the display space; and
    establishing a second spatial column in the spatially-enabled database, for storing, for each of the objects, a second set of spatial data corresponding to the point in time or the duration of time.

6. The computer-implemented method according to claim 1, further comprising the steps of:
    determining, for selected ones of the stored geometric entities, the layout of the selected objects on the display space; and
    rendering the selected ones on the display space according to the determined layout.

7. The computer-implemented method according to claim 1, further comprising the steps of:
    determining, from the stored geometric entities, a spatial relationship between a first object and a second object on the display space; and
    using the determined relationship when rendering the first object and the second object on the display space.

8. A system for mapping display space using spatial extensions, comprising:
    a spatially-enabled database;
    means for establishing a spatial reference system representing a display space of a display device, based upon a coordinate reference system representing the display space;
    means for establishing the display space as a geometric entity within the spatial reference system; and
    means for storing, as geometric entities using the spatial extensions in the spatially-enabled database, descriptions of how objects are to be displayed on the display space, wherein the spatial extensions further comprise one or more data types for representing, for each of the objects, a geocoded description of a position of the object in a page or frame, a position of the page or frame within the display space, and a point in time or a duration of time that the object occupies the position in the page or frame within the display space.

9. The system according to claim 8, wherein the means for storing further comprises means for establishing, in the spatially-enabled database, a spatial column for storing a set of spatial data corresponding to the geometric entities describing how the objects are to be displayed.

10. The system according to claim 9, further comprising means for establishing, in the spatially-enabled database, an attribute column for use by the means for storing, wherein the attribute column stores attribute data corresponding to how each of the objects is to be displayed.

11. The system according to claim 8, further comprising means for establishing, in the spatially-enabled database, a spatial column for use by the means for storing, wherein the spatial column is adapted for storing for each of the object, a set of spatial data corresponding to the position of the object in the page or frame, the position of the page or frame within the display space, and the point in time or the duration of time.

12. The system according to claim 8, further comprising:
    means for establishing a first spatial column in the spatially-enabled database for storing, for each of the objects, a first set of spatial data corresponding to the position of the object in the page or frame and the position of the page or frame within the display space; and means for establishing a second spatial column in the spatially-enabled database for storing, for each of the objects, a second set of spatial data corresponding to the point in time or the duration of time.

13. The system according to claim 8, further comprising:
means for determining for selected ones of the stored geometric entities, the layout of the selected objects on the display space; and
means for rendering the selected ones on the display space according to the determined layout.

14. The system according to claim 8, further comprising:
means for determining, from the stored geometric entities, a spatial relationship between a first object and a second object on the display space; and
means for using the determined relationship when rendering the first object and the second object on the display space.

15. A computer program product for mapping display space using spatial extensions, the computer program product embodied on one or more computer-readable media and comprising:
computer-readable program code means for establishing a spatial reference system representing a display space of a device, based upon a coordinate reference system representing the display space;
computer-readable program code means for establishing the display space as a geometric entity within the spatial reference system; and
computer-readable program code means for storing as geometric entities using the spatial extensions in a spatially-enabled database, descriptions of how objects are to be displayed on the display space, wherein the spatial extensions further comprise one or more data types for representing, for each of the objects geocoded description of a position of the object in a page or frame a position of the page or frame within the display space, and a point in time or a duration of time that the object occupies the position in the page or frame within the display space.

16. The computer program product according to claim 15, wherein the computer-readable program code means for storing further comprises computer-readable program code means for establishing, in the spatially-enabled database, a spatial column for storing a set of spatial data corresponding to the geometric entities describing how the objects are to be displayed.

17. The computer program product according to claim 16, further comprising computer-readable program code means for establishing, in the spatially-enabled database, an attribute column for use by the computer-readable program code means for storing, wherein the attribute column stores attribute data corresponding to how each of the objects is to be displayed.

18. The computer program product according to claim 15, further comprising computer-readable program code means for establishing in the spatially-enabled database, a spatial column for use by the computer-readable program code means for storing, wherein the spatial column is adapted for storing, for each of the objects, a set of spatial data corresponding to the position of the object in the page or frame, the position of the page or frame within the display space, and the point in time or the duration of time.

19. The computer program product according to claim 15, further comprising:
computer-readable program code means for establishing a first spatial column in the spatially-enabled database for storing, for each of the objects, a first set of spatial data corresponding to the position of the object in the page or frame and the position of the page or frame within the display space; and
computer-readable program code means for establishing a second spatial column in the spatially-enabled database for storing, for each of the objects, a second set of spatial data corresponding to the point in time or the duration of time.

20. The computer program product according to claim 15, further comprising:
computer-readable program code means for determining for selected ones of the stored geometric entities, the layout of the selected objects on the display space; and
computer-readable program code means for rendering the selected ones on the display space according to the determined layout.

21. The computer program product according to claim 15, further comprising:
computer-readable program code means for determining, from the stored geometric entities, a spatial relationship between a first object and a second object on the display space; and
computer-readable program code means for using the determined relationship when rendering the first object and the second object on the display space.

* * * * *

UNITED STATES PATENT AND TRADEMARK OFFICE
CERTIFICATE OF CORRECTION

PATENT NO. : 7,091,970 B2  Page 1 of 1
APPLICATION NO. : 10/225505
DATED : August 15, 2006
INVENTOR(S) : Cutlip It is certified that error appears in the above-identified patent and that said Letters Patent is hereby corrected as shown below:

Column 2,
Line 41, change "a spatilly-enabled" to -- a spatially-enabled --;
Line 56, change "geocoder provided" to -- geocoder is provided --;

Column 6,
Line 32, insert a paragraph break between "Corporation.)" and "Communication" --;

Column 12,
Line 59, change "storing for each of the object" to -- storing, for each of the objects --;

Column 13,
Line 9, change "determining for" to -- determining, for --;
Line 35, change "arc to" to -- are to --.

Signed and Sealed this

Thirtieth Day of January, 2007

JON W. DUDAS
*Director of the United States Patent and Trademark Office*